(12) United States Patent
Li et al.

(10) Patent No.: US 11,601,817 B2
(45) Date of Patent: Mar. 7, 2023

(54) POSTPONED ESIM DELIVERY TO SECONDARY MOBILE WIRELESS DEVICE FOR CELLULAR WIRELESS SERVICE SUBSCRIPTION

(71) Applicant: Apple Inc., Cupertino, CA (US)

(72) Inventors: Li Li, Los Altos, CA (US); Keizo Marui, Dundee (CA); Anish Kumar Goyal, Milpitas, CA (US); Abishek Kumar Vaidyanathan, Union City, CA (US); Samy Touati, Pleasanton, CA (US); Rohan C. Malthankar, Cupertino, CA (US)

(73) Assignee: Apple Inc.

( * ) Notice: Subject to any disclaimer, the term of this patent is extended or adjusted under 35 U.S.C. 154(b) by 84 days.

(21) Appl. No.: 17/352,136

(22) Filed: Jun. 18, 2021

(65) Prior Publication Data
US 2021/0400494 A1    Dec. 23, 2021

Related U.S. Application Data

(60) Provisional application No. 63/041,742, filed on Jun. 19, 2020.

(51) Int. Cl.
| | | |
|---|---|---|
| *H04W 8/20* | (2009.01) | |
| *G06Q 40/02* | (2012.01) | |
| *H04W 12/72* | (2021.01) | |
| *H04W 76/10* | (2018.01) | |
| *H04W 8/18* | (2009.01) | |
| *H04W 4/50* | (2018.01) | |
| *H04W 12/06* | (2021.01) | |
| *H04L 67/55* | (2022.01) | |
| *H04W 84/12* | (2009.01) | |

(52) U.S. Cl.
CPC .......... *H04W 12/72* (2021.01); *G06Q 40/025* (2013.01); *H04L 67/55* (2022.05); *H04W 4/50* (2018.02); *H04W 8/183* (2013.01); *H04W 12/06* (2013.01); *H04W 76/10* (2018.02); *H04W 84/12* (2013.01)

(58) Field of Classification Search
CPC ....... H04W 12/72; H04W 4/50; H04W 8/183; H04W 12/06; H04W 76/10; H04W 84/12; H04W 4/60; H04W 8/205; H04W 12/40; G06Q 40/025; H04L 67/55; H04L 41/5041; H04L 67/02; H04L 67/306
See application file for complete search history.

(56) References Cited

U.S. PATENT DOCUMENTS

| | | | | |
|---|---|---|---|---|
| 2012/0167162 | A1* | 6/2012 | Raleigh | H04W 12/069 726/1 |
| 2016/0149966 | A1* | 5/2016 | Remash | H04L 65/1069 370/351 |
| 2020/0137566 | A1* | 4/2020 | Jin | H04W 12/42 |

* cited by examiner

*Primary Examiner* — Joseph E Dean, Jr.
(74) *Attorney, Agent, or Firm* — Dickinson Wright RLLP

(57) ABSTRACT

This Application sets forth techniques for cellular wireless service management for a secondary mobile wireless device assisted by a primary mobile wireless device, including delayed delivery of an electronic subscriber identity module (eSIM) to the secondary mobile wireless device for subscription to cellular wireless service of a mobile network operator (MNO).

20 Claims, 9 Drawing Sheets

POSTPONED ESIM DELIVERY TO SECONDARY MOBILE WIRELESS DEVICE FOR CELLULAR WIRELESS SERVICE SUBSCRIPTION

CROSS-REFERENCE TO RELATED APPLICATIONS

The present application claims the benefit of U.S. Provisional Application No. 63/041,742, entitled "POSTPONED ESIM DELIVERY TO SECONDARY MOBILE WIRELESS DEVICE FOR CELLULAR WIRELESS SERVICE SUBSCRIPTION," filed Jun. 19, 2020, the content of which is incorporated herein by reference in its entirety for all purposes.

FIELD

The described embodiments set forth techniques for cellular wireless service management for a secondary mobile wireless device assisted by a primary mobile wireless device, including delayed delivery of an electronic subscriber identity module (eSIM) to the secondary mobile wireless device for subscription to cellular wireless service of a mobile network operator (MNO) to allow for additional time for checking subscriber information.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of eSIMs—also referred to herein as MNO profiles—and can eliminate the need to include UICC-receiving bays in wireless devices.

Cellular capability continues to be added to a broad variety of wireless devices. In some cases a secondary mobile wireless device requires assistance from an associated primary mobile wireless device to execute a cellular wireless service subscription process. For some MNOs, subscribing to cellular wireless service can require significant time to allow for checking of subscriber information by the MNO that offers the cellular wireless service. Users of both the primary and secondary mobile wireless devices should not be blocked from continued use of their respective devices while the checking of the subscriber information occurs.

SUMMARY

This Application sets forth techniques for cellular wireless service management for a secondary mobile wireless device assisted by a primary mobile wireless device, including delayed delivery of an electronic subscriber identity module (eSIM) to the secondary mobile wireless device for subscription to cellular wireless service of a mobile network operator (MNO). Delivery of the eSIM can await successful completion by the MNO of a check of subscriber information submitted as part of a cellular wireless service subscription process. The MNO may require confirmation of subscriber information, such as an identity check and/or a credit check before delivery of the eSIM can be authorized. The secondary mobile wireless device can be associated with the primary mobile wireless device, such as via a common user account or set of linked user accounts managed by an original equipment manufacturer (OEM) or service provider. The secondary mobile wireless device can be configured to be assisted by the primary mobile wireless device for performing a cellular wireless service subscription process. The primary mobile wireless device can connect to a web-sheet server of the MNO and enter information required for establishing a cellular wireless service subscription for the secondary mobile wireless device. As completion of the subscriber information checking can take significant time, a cellular wireless service subscription process can be paused until receipt of a notification message from a push notification server indicating whether the subscriber information checking succeeded or failed. The primary mobile wireless device and the secondary mobile wireless device can continue to be used for other activities while the MNO processes the subscription information. The primary mobile wireless device can resume the cellular wireless service subscription process, after receipt of a message indicating successful completion of the identity and/or credit checks that may be required by the MNO. The primary mobile wireless device can obtain information for installation of an eSIM from an MNO entitlement server and provide the information to the secondary mobile wireless device, which can download and install the eSIM from an MNO provisioning server. The primary mobile wireless device can provide user interface indications regarding status of the cellular wireless service subscription process for the secondary mobile wireless device, such as 'in process', while waiting for MNO subscription information checking, 'activating', while downloading and installing the eSIM, and 'ready' when eSIM installation successfully completes.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
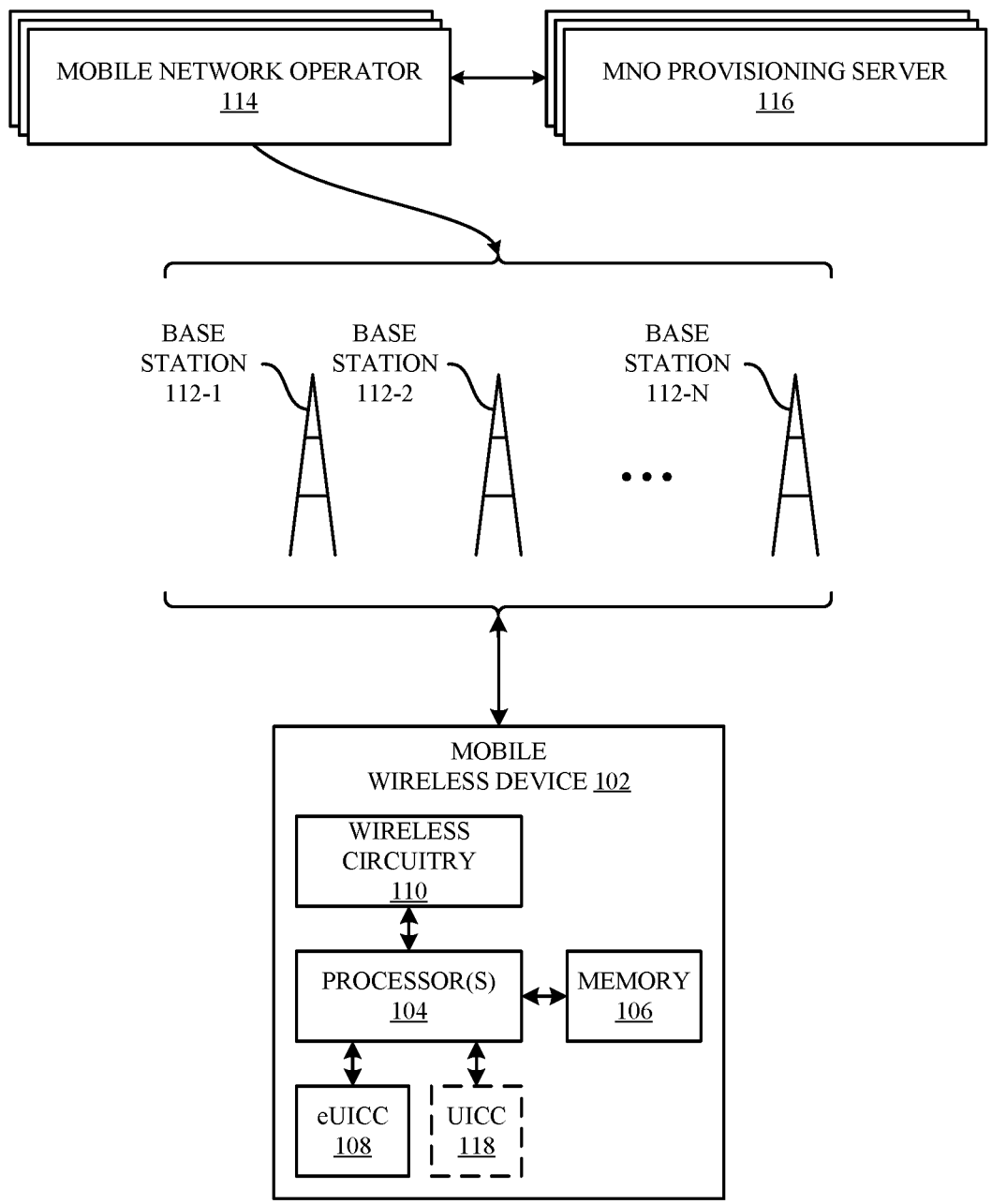
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for cellular wireless service management for a secondary mobile wireless device assisted by a primary mobile wireless device, including delayed delivery of an electronic subscriber identity module (eSIM) to the secondary mobile wireless device for subscription to cellular wireless service of a mobile network operator (MNO). A primary mobile wireless device can initiate a cellular wireless service subscription process for a secondary mobile wireless device, e.g., via an application or an operating system configuration setting on the primary mobile wireless device. The primary mobile wireless device can connect to an applicable MNO web-sheet server, e.g., via a secure data internet connection and provide subscription information that may be required by the MNO to add cellular wireless service to the secondary mobile wireless device. The MNO may require subscriber information checking, such as an identity check and/or a credit check. Subscriber information can be submitted via the primary mobile wireless device, such as using a camera, a scanning function, and/or biometric input, such as facial recognition, and/or uploading of a document to the MNO web-sheet server. Delivery of the eSIM to the secondary mobile wireless device can await successful completion by the MNO of a check of the subscriber information submitted as part of a cellular wireless service subscription process. The MNO may require confirmation of subscriber information, such as the identity check and/or the credit check before reservation of the eSIM for the secondary mobile wireless device and subsequent delivery of the eSIM is authorized. The secondary mobile wireless device can be associated with the primary mobile wireless device, such as via a common user account or set of linked user accounts managed by an original equipment manufacturer (OEM) or service provider. The secondary mobile wireless device can be configured to be assisted by the primary mobile wireless device for performing a cellular wireless service subscription process. As completion of the subscriber information checking can take significant time, a cellular wireless service subscription process can be paused until receipt of a notification message from a push notification server indicating whether the subscriber information checking by the MNO succeeded or failed. The primary mobile wireless device and the secondary mobile wireless device can continue to be used for other activities while the MNO processes the subscription information. The primary mobile wireless device can resume the cellular wireless service subscription process, after receipt of a message indicating successful completion of the identity and/or credit checks that may be required by the MNO. The primary mobile wireless device can obtain information for installation of an eSIM from an MNO entitlement server and provide the information to the secondary mobile wireless device, which can download and install the eSIM from an MNO provisioning server. The primary mobile wireless device can provide user interface indications regarding status of the cellular wireless service subscription process for the secondary mobile wireless device, such as 'in process', while waiting for MNO subscription information checking, 'activating', while downloading and installing the eSIM, and 'ready' when eSIM installation successfully completes. In some embodiments, the primary mobile wireless device displays an error notification message after receipt of a message indicating failure of the MNO subscription information check. In some embodiments, resumption and completion of the cellular subscription process for the secondary mobile wireless device proceeds in the background without requiring user interaction. Communication between the primary and secondary mobile wireless devices can preferably use a local connection, such as via a wireless personal area network, via a wireless local area network, or via a peer-to-peer network, when the primary and secondary mobile wireless devices are within a pre-determined proximity distance of each other. Communication between the primary and secondary mobile wireless devices can use relayed messaging via a store-and-forward messaging server when the primary and secondary mobile wireless devices are not within the pre-determined proximity distance of each other.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®), the base stations 112-1 to 112-N can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMS (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO 114, an eSIM is reserved for subsequent download and installation to the eUICC 108. In some embodiments, the eUICC 108 obtains one or more eSIMs from one or more associated MNO provisioning servers 116. The MNO provisioning servers 116 can be maintained by a manufacturer of the mobile wireless device 102, the MNOs 114, third party entities, and the like. Communication of eSIM data between the MNO provisioning server 116 and the eUICC 108 (or between the MNO provisioning server 116 and processing circuitry of the mobile wireless device 102 external to the eUICC 108, e.g., the processor 104) can use a secure communication channel.

The mobile wireless device 102, upon initial acquisition by a user, can lack an activated eSIM and require the user to download a functional eSIM for the MNO 114 from a corresponding MNO provisioning server 116. As part of a cellular subscription process, the user of the mobile wireless device 102 or of an associated mobile wireless device can input subscription information, including information to use for identity checking and/or credit checking, via the associated mobile wireless device 102. Authorization to download the eSIM to the mobile wireless device 102 can depend on successful completion of identity checks and/or credit checks by the MNO 114, after which the mobile wireless device 102 can download the eSIM from the MNO provisioning server 116. Both mobile wireless devices 102 can be associated with a common user account. Upon activation of the eSIM, the mobile wireless device 102 can connect to the cellular wireless network of the MNO 114 to access services provided therefrom.

Figure 2:
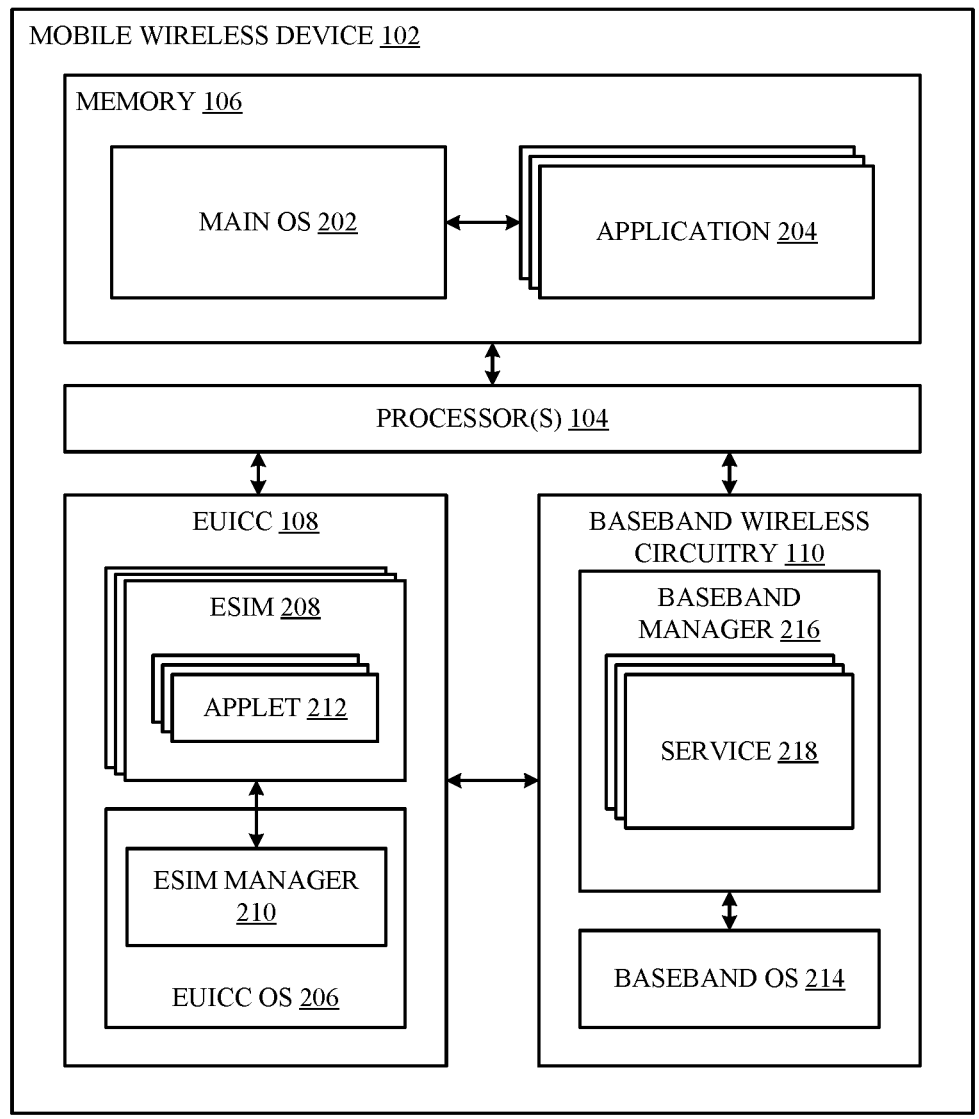
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtain information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
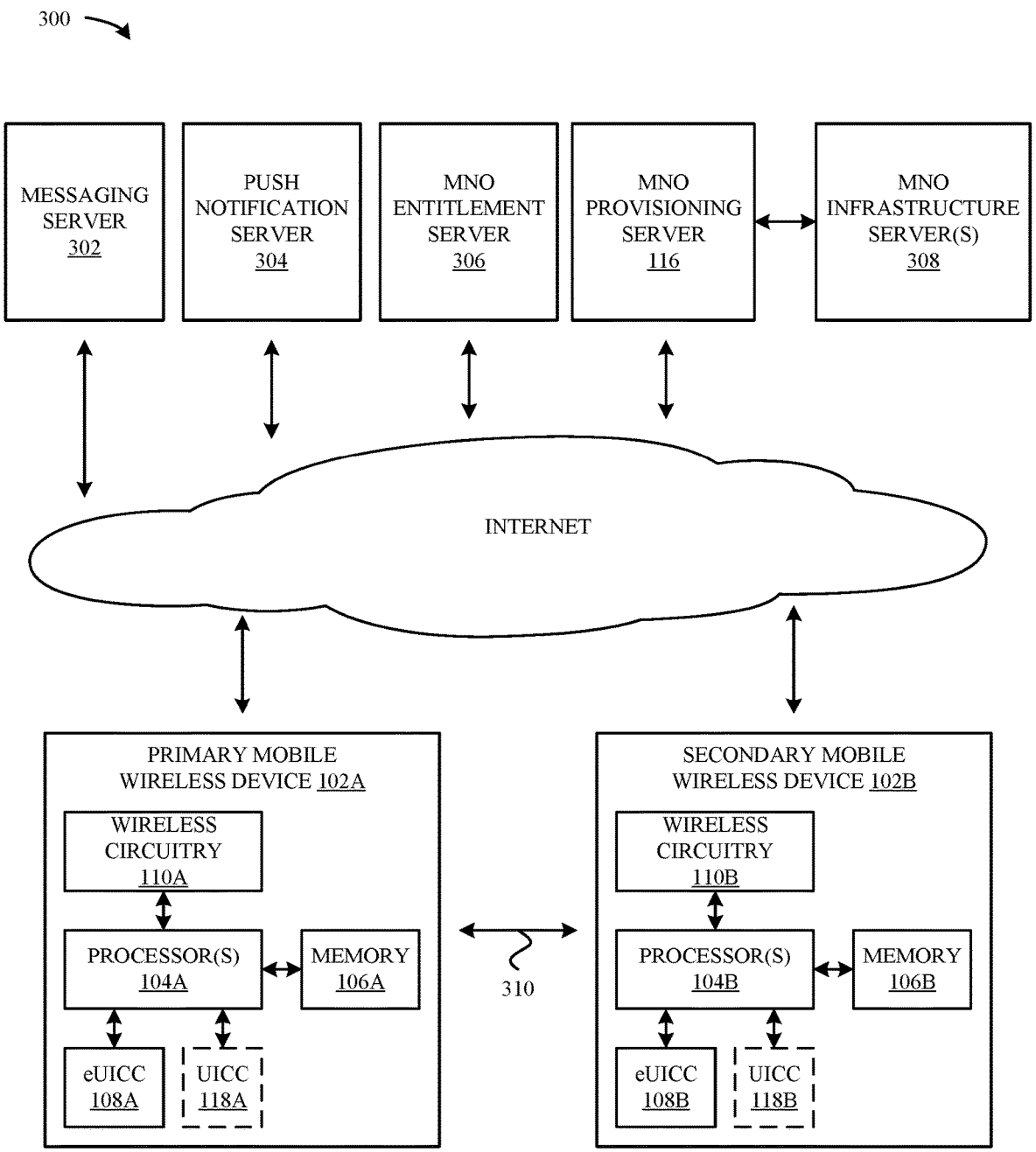
FIG. 3 illustrates a block diagram of an exemplary system for provisioning an eSIM to a secondary mobile wireless device, according to some embodiments.

FIG. 3 illustrates a diagram 300 of an exemplary system for provisioning an eSIM 208 to an eUICC 108 of a secondary mobile wireless device 102B with assistance from a primary mobile wireless device 102A. The primary mobile wireless device 102A and the secondary mobile wireless device 102B can communicate with each other over a wireless connection 310, which can be a direct, local connection, such as via a wireless personal area network (WPAN), via a wireless local area network (WLAN), or via a peer-to-peer connection, or which can be an indirect connection, such as via an access point of a WLAN, via an Internet data connection, via a relaying, intermediate wireless device (not shown), or via a relayed message service or alternate data connection via a network-based server, such as a store-and-forward messaging server 302. The primary and secondary mobile wireless devices 102A, 102B can also communicate with various network-based servers via an Internet data connection, which can include cellular wireless connections, in some cases, and non-cellular wireless connections, in some cases, depending on their respective capabilities. In some embodiments, the primary and secondary mobile wireless devices 102A, 102B use a direct, local connection when within a pre-determined proximity distance of each other during a cellular subscription process. In some embodiments, the primary and secondary mobile wireless devices 102A, 102B use a relayed, indirect connection via the store-and-forward messaging server 302 when they are not within a pre-determined proximity distance of each other (and/or a direct, local connection is not available) during the cellular subscription process. Each of the primary mobile wireless device 102A and the secondary mobile wireless device 102B can be registered with a common user account, such as maintained by a push notification server 304, by a cloud-based network server (not shown), such as an iCloud® server, and/or by another associated network-based server. The primary and secondary mobile wireless devices 102A and 102B can each receive push notification messages from the push notification server 304. The primary mobile wireless device 102A (and, in some cases, the secondary mobile wireless device 102B) can also communicate with an MNO entitlement server 306 to ascertain information regarding eSIMs 208 available for provisioning. The primary mobile wireless device 102A and the secondary mobile wireless device 102B can also communicate with an MNO provisioning server 116 from which to download one or more eSIMs 208 for installation on their respective eUICCs 108. The primary and secondary mobile wireless devices 102A, 102B can also communicate with additional network-based servers, such as one or more MNO infrastructure servers 308, for management of cellular wireless services provided by MNOs 114 based on eSIMs 208 installed in eUICCs 108 of the devices.

Figure 4A:
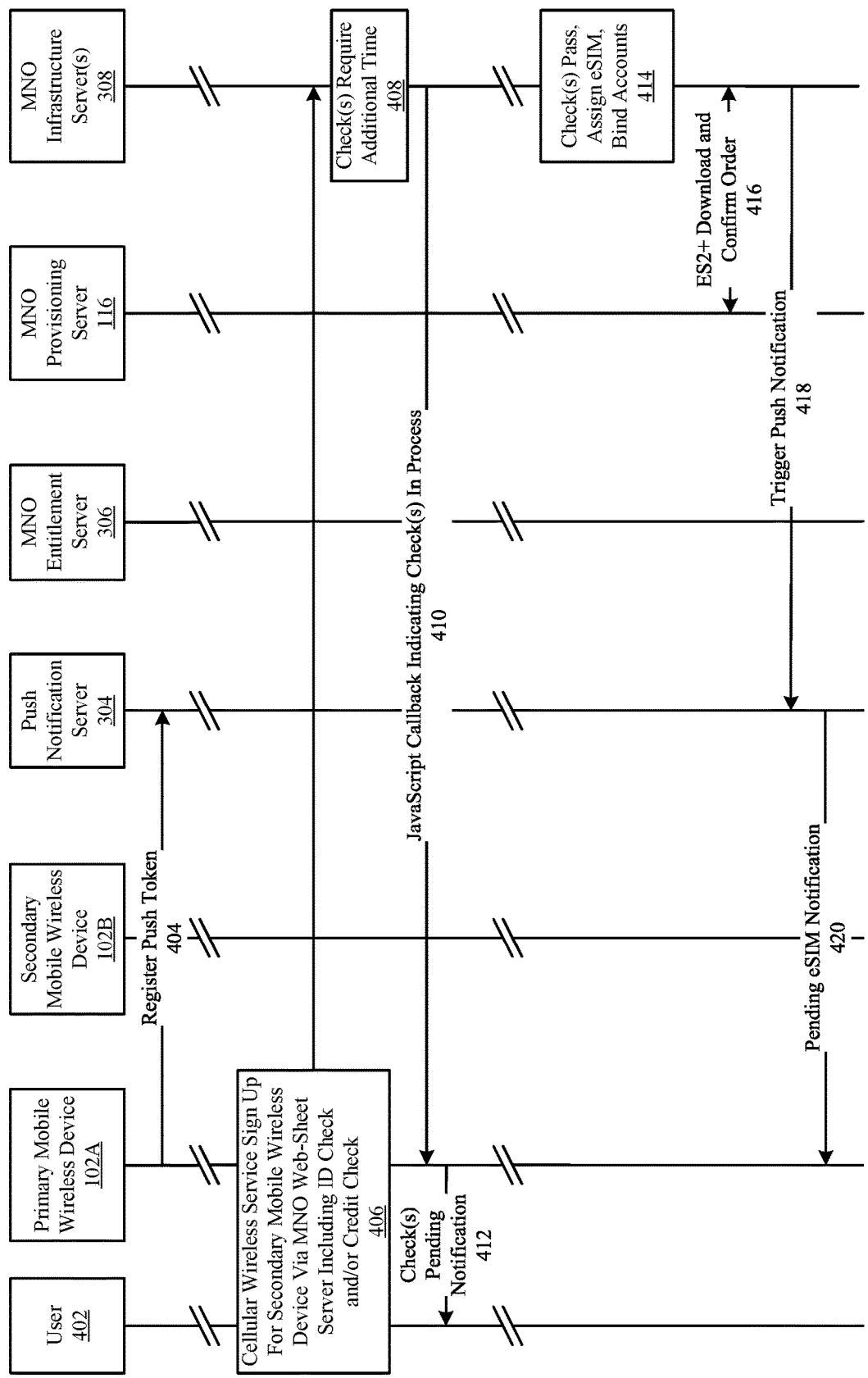
FIGS. 4A and 4B illustrate an exemplary sequence of actions performed to provision an eSIM with delayed delivery to a secondary mobile wireless device assisted by a primary mobile wireless device, according to some embodiments.
Figure 4B:
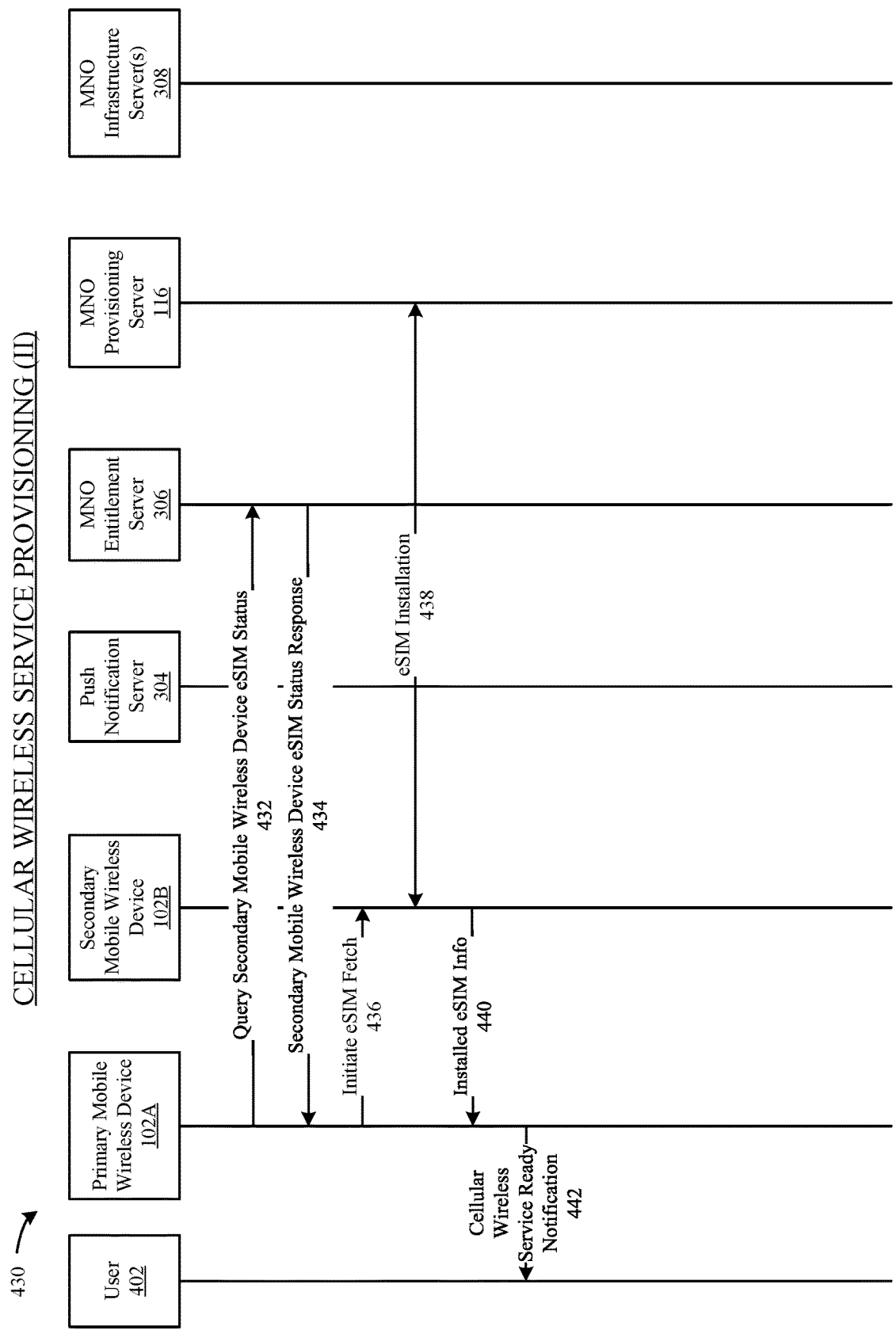

FIGS. 4A and 4B illustrate diagrams 400, 430 of an exemplary sequence of actions that can be performed to provision an eSIM 208 to a secondary mobile wireless device 102B, with assistance provided by a primary mobile wireless device 102A. The primary mobile wireless device 102A can be configured for operation by a user 402, while the secondary mobile wireless device 102B can be configured for operation by the user 402 or by another user (not shown). At 404, the primary mobile wireless device 102A can register with a push notification server 304, e.g., by providing a push token to the push notification server 304, in order to receive push notification messages associated with events applicable to the primary mobile wireless device 102A. In some embodiments, the push notification server 304 is managed by an original equipment manufacturer (OEM) of the primary mobile wireless device 102A. At 406, the user 402 can sign up with an MNO 114 for cellular wireless service to be provided to the secondary mobile wireless device 102B. The user 402 can request that a subscription to a cellular wireless service be assigned to the secondary mobile wireless device 102B via an on-line cellular wireless service subscription process, such as on-line by interacting with a network-based server managed by the MNO 114 from which cellular wireless service will be provided. In some embodiments, the user 402 interacts with an MNO web-sheet server via an Internet data connection. The MNO web-sheet server can be one of the MNO infrastructure servers 308. As part of the cellular wireless service subscription process with the MNO web-sheet server, the user 402 may be required to provide subscription information to be checked by the MNO 114. Subscription information that may be required by the MNO 114 can include information for an identity check, such as i) submission of a photograph of the user 402, e.g., taken with a camera of the primary mobile wireless device 102A, ii) submission of a photograph of an identity card, e.g., of a national identity card, a driver's license, or a passport, and/or iii) submission of biometric data, such as taken with a fingerprint scanner or facial recognition software. Subscription information that may be required by the MNO 114 can also include information for a credit check, such as a social security number. Processing of the information to complete checking of the submitted subscription information can, in some cases, take a substantial length of time, e.g., many minutes or hours, to complete. When checks complete in a short period of time, e.g., less than a minute, the primary mobile wireless device 102A can obtain information for provisioning of an eSIM 208 allocated for the secondary mobile wireless device 102B and can provide an indication to the secondary mobile wireless device 102B to initiate downloading and installation of the eSIM 208 to the secondary mobile wireless device 102B. When, at 408, checks require additional time to complete, e.g., more than a pre-determined waiting time period, the MNO infrastructure servers 308, e.g., the MNO web-sheet server, at 410, can send a JavaScript callback message to the primary mobile wireless device 102A indicating that the checks are in process. The primary mobile wireless device 102A, at 412, can provide a notification to the user 402 that the checks are pending completion. While checks are ongoing, an eSIM 208 can be not yet reserved for the secondary mobile wireless device 102B, as checks may not succeed.

After checks succeed, at 414, the MNO infrastructure servers 308 can assign an eSIM 208 for provisioning to the secondary mobile wireless device 102B. In some embodiments, a cellular wireless service account is established for the secondary mobile wireless device 102B, and the cellular wireless service account is bound to a separate cellular wireless service account maintained for the primary mobile wireless device 102A. In some embodiments, the cellular wireless service account for the secondary mobile wireless device 102B is a sub-account of a cellular wireless service account for the primary mobile wireless device 102A. As a result of establishing a subscription for cellular wireless service for the secondary mobile wireless device 102B, an ES2+ download order and confirmation order can be provided, at 416, by an MNO infrastructure server 308 to an MNO provisioning server 116. The ES2+ download order can cause the MNO provisioning server 116 to reserve an eSIM 208 for provisioning to the secondary mobile wireless device 102B. At 418, an MNO infrastructure server 308 can send a message to the push notification server 304 to cause the push notification server 304 to send a push notification message, to the primary mobile wireless device 102A, indicating availability of the eSIM 208 reserved for the secondary mobile wireless device 102B. At 432, the primary mobile wireless device 102A can send a message, e.g., a check SIM status message, to the MNO entitlement server 306 to obtain information about the eSIM 208 reserved for the secondary mobile wireless device 102B. The MNO entitlement server 306 can respond to the message from the primary mobile wireless device 102A with information regarding the eSIM 208 reserved for the secondary mobile wireless device 102B, such as a network address, e.g., a uniform resource locator (URL) name for the MNO provisioning server 116 from which to download the eSIM 208, and an identifier for the eSIM 208 reserved for the secondary mobile wireless device 102B, such as an integrated circuit card identifier (ICCID) value or a hashed version thereof. At 436, the primary mobile wireless device 102A sends a message to the secondary mobile wireless device 102B, via the wireless connection 310, the message notifying the secondary mobile wireless device 102B about the reserved eSIM 208 to cause the secondary mobile wireless device 102B to fetch the eSIM 208 from the MNO provisioning server 116. Responsive to receipt of the message to initiate eSIM provisioning, the secondary mobile wireless device 102B, at 438, establishes a secure connection to the MNO provisioning server 116 and downloads and installs the eSIM 208 from the MNO provisioning server 116. At 440, the secondary mobile wireless device 102B provides an indication to the primary mobile wireless device 102A when the eSIM 208 has been successfully downloaded and installed on the eUICC 108 of the secondary mobile wireless device 102B. At 442, the primary mobile wireless device 102A provides an indication, e.g., via updating a user interface display and/or with a pop-up notification message, that cellular wireless service for the secondary mobile wireless device 102B has completed successfully and is ready for use to access cellular wireless services of the MNO 114. In some embodiments, when checks do not succeed, the MNO infrastructure servers 308 provide a message about the check failure to the push notification server 304, which provides a push notification to the primary mobile wireless device 102A indicating the check failure. The primary mobile wireless device 102A can provide an error indication, e.g., an update to a user interface display and/or a pop-up notification message indicating the check failure. In some embodiments, the error indication can include information for subsequent actions that the user can take, e.g., to contact the MNO 114 via an MNO network server uniform resource locator (URL), or via a customer service agent at a designated phone number.

Figure 5:
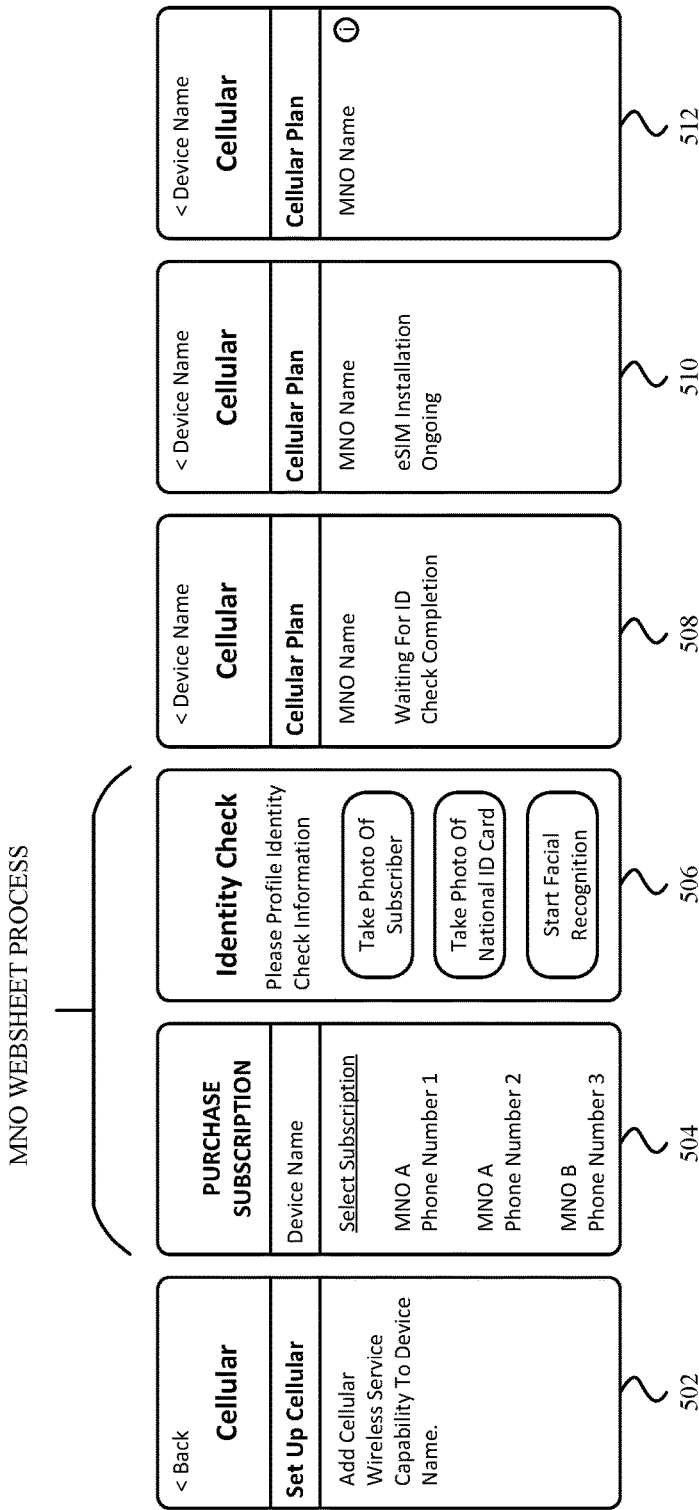
FIG. 5 illustrates an exemplary set of user interface display screens at a primary mobile wireless device for a portion of a cellular wireless service subscription process to provision an eSIM with delayed delivery to a secondary mobile wireless device, according to some embodiments.

FIG. 5 illustrates a diagram 500 of an exemplary set of user interface display screens at a primary mobile wireless device 102A for a portion of a cellular wireless service subscription process to provision an eSIM 208 with delayed delivery to a secondary mobile wireless device 102B. At 502, an option to set up cellular wireless service for the secondary mobile wireless device 102B can be presented via a display of the primary mobile wireless device 102A. The option can be presented as part of a set up process for the secondary mobile wireless device 102B or as a configuration setting accessible via an application or operating system setting of the primary mobile wireless device 102A. Selection by a user to set up cellular wireless service for the secondary mobile wireless device 102B can redirect the user to an MNO web-sheet server that can present, at 504, options for cellular wireless service subscription selection. In some embodiments, the options can include subscription information for one or more MNOs. After selection of a cellular wireless service subscription for the secondary mobile wireless device 102B, the MNO web-sheet server may require additional subscription information, such as for an identity check illustrated at 506, where one or more options can be presented, such as to photograph a user, to photograph a copy of a national identity card, or to perform biometric processing, such as via a facial recognition process. At 508, the user interface provides an indication that the cellular wireless service subscription process is paused to wait for completion of checking of submitted subscription information. Upon successful completion of the checking of the subscription information, at 510, the user interface provides an indication that provisioning (downloading and installation) of an eSIM 208 for accessing cellular wireless services of an MNO 114 for the secondary mobile wireless device 102B is in process (ongoing). At 512, upon successful installation of the eSIM 208 to the secondary mobile wireless device 102B and activation of the eSIM 208, the user interface of the primary mobile wireless device 102A is updated to indicate access to cellular wireless service via the MNO 114 is available for the secondary mobile wireless device 102B. In some embodiments, selecting an information icon on the display screen indicated at 512 can provide additional information, such as by re-directing the user to access an MNO server for management of the cellular wireless service plan for the secondary mobile wireless device 102B.

Figure 6:
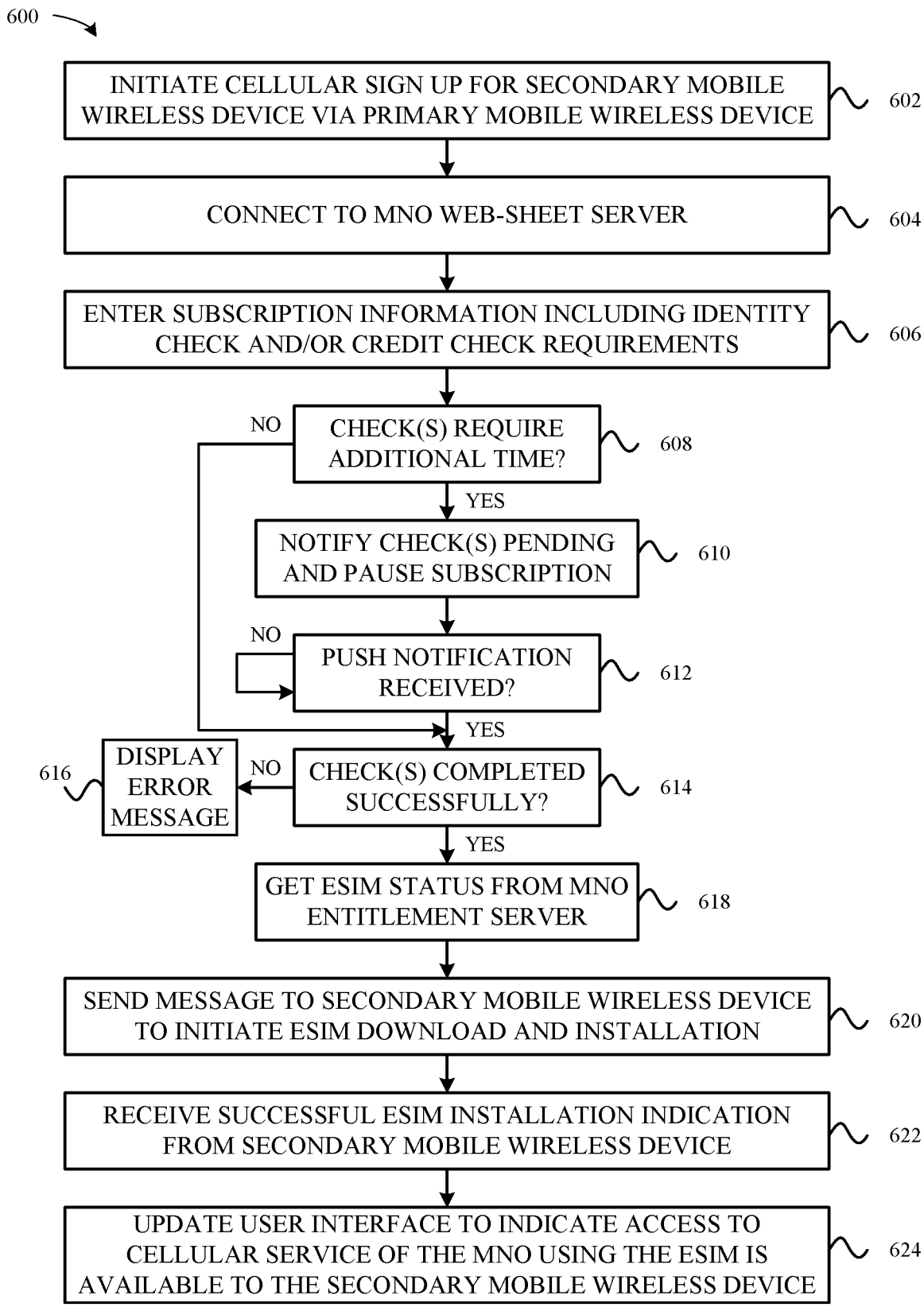
FIG. 6 illustrates a flowchart of an exemplary set of actions performed by a primary mobile wireless device to provision an eSIM to a secondary mobile wireless device with delayed delivery, according to some embodiments.

FIG. 6 illustrates a flowchart 600 of an exemplary set of actions performed by a primary mobile wireless device 102A to provision an eSIM 208 to a secondary mobile wireless device 102B with delayed delivery. At 602, a user 402 can initiate cellular wireless service subscription for a secondary mobile wireless device 102B via a primary mobile wireless device 102A. At 604, the primary mobile wireless device 102A can connect to an MNO web-sheet server (which can be part of a set of MNO infrastructure servers 308) to perform a cellular wireless service subscription process. At 606, the user 402 can enter subscription information including information for an identity check and/or information for a credit check that may be required by the MNO 114 for which cellular wireless service is sought for the secondary mobile wireless device 102B. At 608, the primary mobile wireless device 102A can receive a message from an MNO infrastructure server 308 indicating whether checks of the submitted subscription information require additional time to complete. When checks require additional time to complete, e.g., more than a pre-determined waiting time period, the primary mobile wireless device 102A can, at 610, pause the cellular wireless service subscription process and provide a notification that checking of the submitted subscription information is pending. At 612, the primary mobile wireless device 102A can initiate a background monitoring process to check for a push notification message regarding status of the subscription information checking. While the cellular wireless service subscription process is paused, a user of the primary mobile wireless device 102A and a user of the secondary mobile wireless device 102B can continue to use their respective mobile wireless devices 102A, 102B for other tasks while awaiting the pending subscription information checking to complete. After checks complete, at 614, the primary mobile wireless device 102A can determine whether the checks completed successfully, e.g., based on a push notification message received from the push notification server 304 or a message from another server, such as an MNO infrastructure server 308. When checking of the subscription information fails, the primary mobile wireless device 102A can display an error message indicating status of the cellular wireless service subscription for the secondary mobile wireless device 102B. In some embodiments, the error message provides information, e.g., a selectable URL link or customer service phone number, for the user. When the checks complete successfully, at 618, the primary mobile wireless device 102A can receive a push notification message indicating a pending eSIM 208 for the secondary mobile wireless device 102B has been allocated and is ready for provisioning to the secondary mobile wireless device 102B. At 618, the primary mobile wireless device 102A can obtain, from the MNO entitlement server 306, status of the eSIM 208 reserved for the secondary mobile wireless device 102B, where the status can include information applicable for provisioning of the eSIM 208 to the secondary mobile wireless device 102B, such as a network address for an MNO provisioning server 116 and an ICCID value (or hashed version thereof) for the eSIM 208. At 620, the primary mobile wireless device 102A sends to the secondary mobile wireless device 102B a message to initiate provisioning (download and installation) of the eSIM 208 to the secondary mobile wireless device 102B from the MNO provisioning server 116. In some embodiments, the message includes the network address for the MNO provisioning server 116 and/or the ICCID value for the eSIM 208. At 622, the primary mobile wireless device 102A receives from the secondary mobile wireless device 12B an indication of successful installation of the eSIM 208. At 625, the primary mobile wireless device 102A updates a user interface to indicate access to cellular wireless service of the MNO 114 using the eSIM 208 is available to the secondary mobile wireless device 102B.

Figure 7:
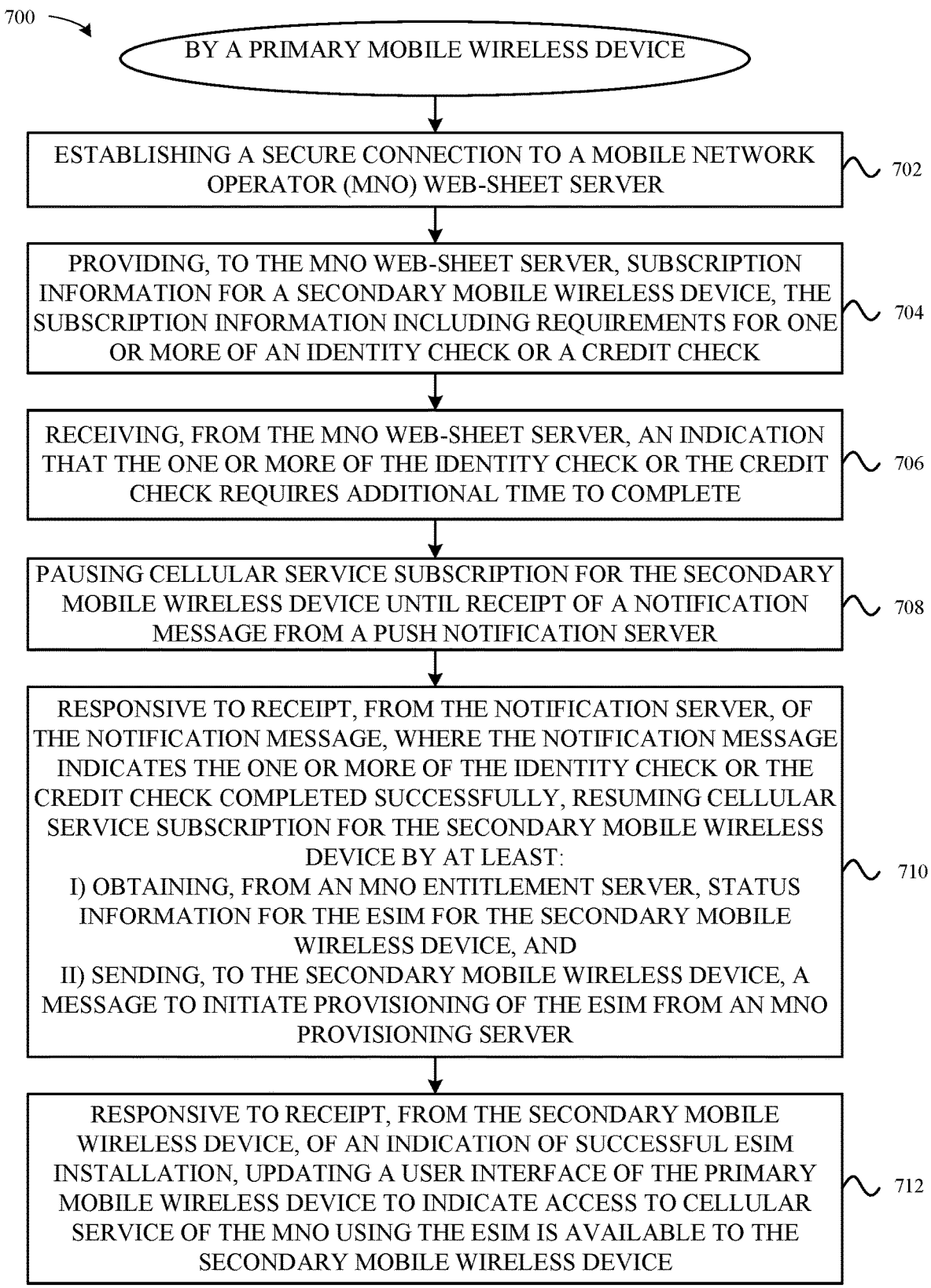
FIG. 7 illustrates a flowchart of an exemplary method performed by a primary mobile wireless device to provision an eSIM to a secondary mobile wireless device with delayed delivery, according to some embodiments.

FIG. 7 illustrates a diagram 700 of a flowchart for an exemplary method performed by a primary mobile wireless device 102A to provisioning an eSIM 208 to a secondary mobile wireless device 102B with delayed delivery of the eSIM 208. At 702, the primary mobile wireless device 102A establishes a secure connection to an MNO web-sheet server. At 704, the primary mobile wireless device 102A provides, to the MNO web-sheet server, subscription information for the secondary mobile wireless device 102B, the subscription information including requirements for one or more of an identity check or a credit check. At 706, the primary mobile wireless device 102A receives, from the MNO web-sheet server, an indication that the one or more of the identity check or the credit check requires additional time to complete. At 708, the primary mobile wireless device 102A pauses cellular wireless service subscription for the secondary mobile wireless device 102B until receipt of a notification message from a push notification server 304. At 710, responsive to receipt, from the push notification server 304, of the notification message, where the notification message indicates the one or more of the identity check or the credit check completed successfully, the primary mobile wireless device 102A resumes cellular wireless service subscription for the secondary mobile wireless device 102B by at least: i) obtaining, from an MNO entitlement server 306, status information for the eSIM 208 for the secondary mobile wireless device 102B, and ii) sending, to the secondary mobile wireless device 102B, a message to initiate provisioning of the eSIM 208 from an MNO provisioning server 116. At 712, responsive to receipt, from the secondary mobile wireless device 102B, of an indication of successful eSIM 208 installation, the primary mobile wireless device 102A updates a user interface of the primary mobile wireless device 102A to indicate access to cellular wireless service of the MNO 114 using the eSIM 208 is available to the secondary mobile wireless device 102B.

In some embodiments, the primary mobile wireless device 102A, responsive to receipt, from the push notification server 304, of the notification message, where the notification message indicates the one or more of the identity check or the credit check did not complete successfully, presents, via a display of the primary mobile wireless device 102A, an error message indicating failure of the one or more of the identify check or the credit check. In some embodiments, the primary mobile wireless device 102A updates the user interface of the primary mobile wireless device 102A by at least presenting, via a display of the primary mobile wireless device 102A, a success message. In some embodiments, the method further includes the primary mobile wireless device 102A connecting to the secondary mobile wireless device 102B responsive to receipt of a user input acknowledging the success message. In some embodiments, the primary mobile wireless device 102A sends the message to initiate provisioning of the eSIM 208 via a wireless personal area network (WPAN) connection when the primary mobile wireless device 102A and the secondary mobile wireless device 102B are within a pre-determined proximity distance of each other. In some embodiments, the primary mobile wireless device 102A sends the message to initiate provisioning of the eSIM 208 via a wireless local area network (WLAN) connection when the primary mobile wireless device 102A and the secondary mobile wireless device 102B i) are not within a pre-determined proximity distance of each other and ii) are connected to a common WLAN. In some embodiments, the primary mobile wireless device 102A sends the message to initiate provisioning of the eSIM 208 via a store-and-forward messaging server 302 when the primary mobile wireless device 102A and the secondary mobile wireless device 102B i) are not within a pre-determined proximity distance of each other and ii) are not connected to a common WLAN. In some embodiments, the primary mobile wireless device 102A provides an indication via a display of the primary mobile wireless device 102A when pausing the cellular wireless service subscription. In some embodiments, the primary mobile wireless device 102A responsive to receipt, from the push notification server 304, of the notification message, where the notification message indicates the one or more of the identity check or the credit check completed successfully, presents, via a display of the primary mobile wireless device 102A, an indication of ongoing eSIM 208 installation.

In some embodiments, the primary mobile wireless device 102A and the secondary mobile wireless device 102B are associated with a common cloud-based service account. In some embodiments, the primary mobile wireless device 102A and the secondary mobile wireless device 102B have distinct, linked user accounts. In some embodiments, the primary mobile wireless device 102A and the secondary mobile wireless device 102B share a common cellular wireless service subscription account of the MNO 114. In some embodiments, the primary mobile wireless device 102A and the secondary mobile wireless device 102B each have distinct cellular wireless service subscription accounts with the MNO 114. In some embodiments, the primary mobile wireless device 102A and the secondary mobile wireless device 102B each have distinct cellular wireless service subscription accounts with different MNOs 114.

In some embodiments, requirements for the identity check include a photograph of a user of the primary mobile wireless device 102A. In some embodiments, requirements for the identity check include a photograph of a user of the secondary mobile wireless device 102B. In some embodiments, requirements for the identity check include a photograph of a national identity card. In some embodiments, requirements for the identity check include a biometric input. In some embodiments, the biometric input includes a facial recognition capture.

In some embodiments, an apparatus configurable for operation in a primary mobile wireless device 102A, includes one or more processors communicatively coupled to a memory storing instructions that, when executed by the one or more processors, cause the primary mobile wireless device 102A to perform actions including: i) providing, to an MNO web-sheet server, subscription information for a secondary mobile wireless device 102B; ii) receiving, from the MNO web-sheet server, an indication that the one or more of an identity check or a credit check requires additional time to complete; iii) pausing cellular wireless service subscription for the secondary mobile wireless device 102B; and iv) responsive to receipt, from a push notification server 304, of a notification message indicating the one or more of the identity check or the credit check completed successfully, resuming cellular wireless service subscription for the secondary mobile wireless device 102B by obtaining, from an MNO entitlement server 306, status information for an eSIM 208 for the secondary mobile wireless device 102B, and sending, to the secondary mobile wireless device 120B, a message to initiate provisioning of the eSIM 208 from an MNO provisioning server 116.

In some embodiments, the subscription information for the secondary mobile wireless device 102B includes requirements for one or more of the identity check or the credit check. In some embodiments, execution of the instructions further causes the primary wireless device 102A to, responsive to receipt, from the secondary mobile wireless device 120B, of an indication of successful eSIM 208 installation, updating a user interface of the primary mobile wireless device 102A to indicate access to cellular wireless service of the MNO 114 using the eSIM 208 is available to the secondary mobile wireless device 102B. In some embodiments, the requirements for the identity check include a photograph of a user of the primary mobile wireless device. In some embodiments, the requirements for the identity check include: i) a photograph of a user of the secondary mobile wireless device, ii) a photograph of a national identity card, or iii) a biometric input. In some embodiments, the biometric input includes a facial recognition capture.

In some embodiments, a method for delayed cellular wireless service eSIM 208 subscription for a secondary mobile wireless device 102B includes a primary mobile wireless device 102A performing actions including: i) providing, to an MNO web-sheet server, subscription information for the secondary mobile wireless device 102B; ii) receiving, from the MNO web-sheet server, an indication that an identity check requires additional time to complete; iii) pausing cellular wireless service subscription for the secondary mobile wireless device 102B; and iv) responsive to receipt, from a push notification server 304, of a notification message indicating the identity check completed successfully, resuming cellular wireless service subscription for the secondary mobile wireless device by at least: 102B obtaining, from an MNO entitlement server 306, status information for an eSIM 208 for the secondary mobile wireless device 102B, and sending, to the secondary mobile wireless device 102B, a message to initiate provisioning of the eSIM 208 from an MNO provisioning server 116.

Figure 8:
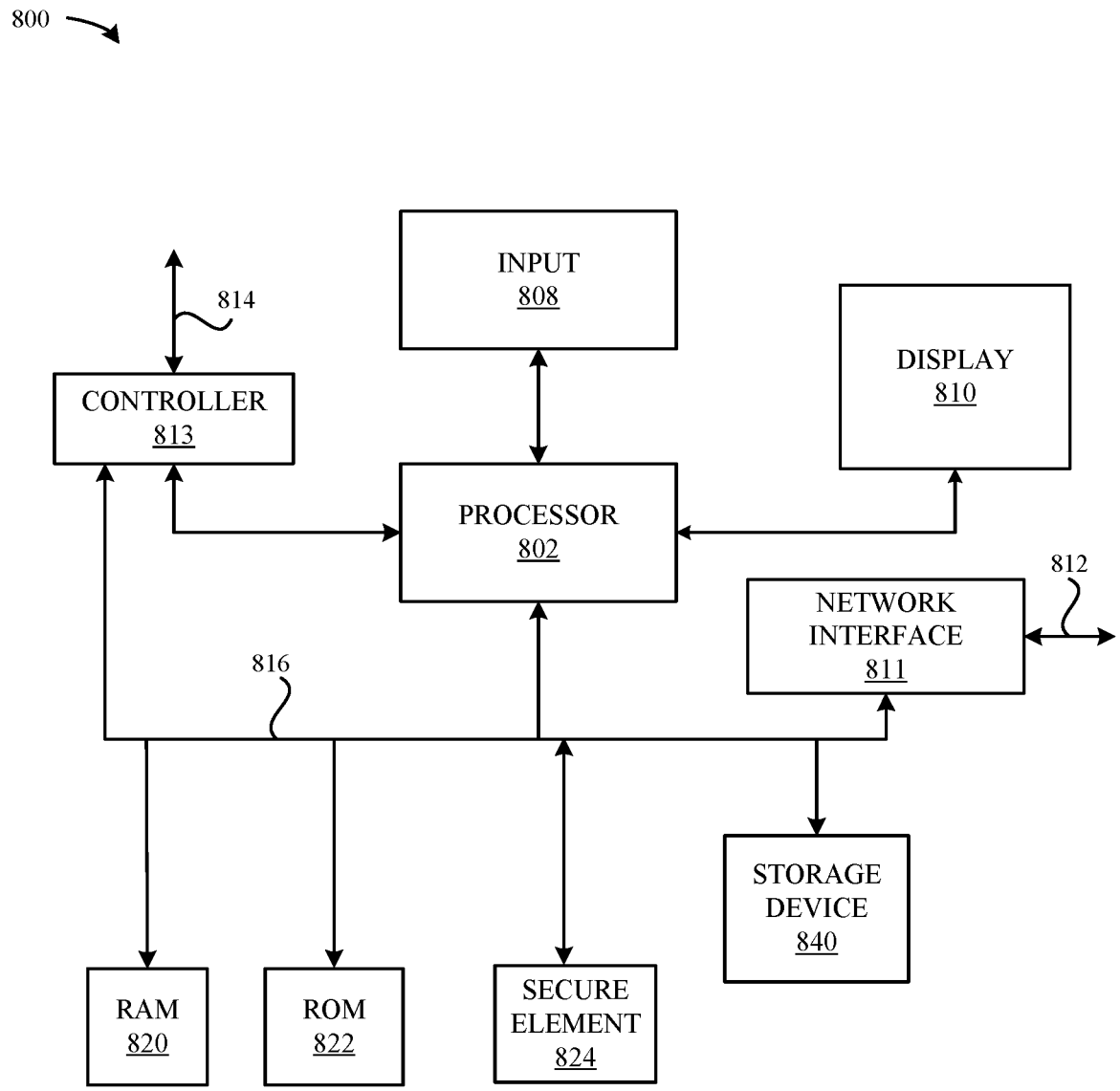
FIG. 8 illustrates a block diagram of exemplary elements of a mobile wireless device, according to some embodiments.

FIG. 8 illustrates a detailed view of a representative computing device 800 that can be used to implement various methods described herein, according to some embodiments. In particular, the detailed view illustrates various components that can be included in a mobile wireless device 102, e.g., the primary mobile wireless device 102A, and/or the secondary mobile wireless device 102B. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 that can be controlled by the processor 802 to display information to the user. A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that communicatively couples to a data link 812. In the case of a wireless connection, the network/bus interface 811 can include a wireless transceiver.

The computing device 800 also includes a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800. The computing device 800 can further include a secure element (SE) 824, which can represent secure storage for cellular wireless system access by a mobile wireless device 102, the primary mobile wireless device 102A, and/or the secondary mobile wireless device 102B. The secure element 824 can include an eUICC 108 on which to store one or more eSIMs 208.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A primary mobile wireless device configured comprising:
  wireless circuitry comprising one or more antennas; and
  one or more processors communicatively coupled to the wireless circuitry and to a memory storing instructions that, when executed by the one or more processors, cause a secondary mobile wireless device to perform actions including:
    establishing a secure connection to a mobile network operator (MNO) web-sheet server;
    providing, to the MNO web-sheet server, subscription information for the secondary mobile wireless device, the subscription information including requirements for one or more of an identity check or a credit check;
    receiving, from the MNO web-sheet server, an indication that the one or more of the identity check or the credit check requires additional time to complete;
    pausing cellular wireless service subscription for the secondary mobile wireless device until receipt of a notification message from a push notification server;
    responsive to receipt, from the push notification server, of the notification message, where the notification message indicates the one or more of the identity check or the credit check completed successfully, resuming cellular wireless service subscription for the secondary mobile wireless device by at least:
      obtaining, from an MNO entitlement server, status information for an electronic subscriber identity module (eSIM) for the secondary mobile wireless device; and
      sending, to the secondary mobile wireless device, a message to initiate provisioning of the eSIM from an MNO provisioning server; and
    responsive to receipt, from the secondary mobile wireless device, of an indication of successful eSIM installation, updating a user interface of the primary mobile wireless device to indicate access to cellular wireless service of the MNO using the eSIM is available to the secondary mobile wireless device.

2. The primary wireless device of claim 1, wherein execution of the instructions further causes the primary wireless device to, responsive to receipt, from the push notification server, of the notification message, where the notification message indicates the one or more of the identity check or the credit check did not complete successfully, present, via a display of the primary mobile wireless device, an error message indicating failure of the one or more of the identify check or the credit check.

3. The primary wireless device of claim 1, wherein:
  the updating the user interface of the primary mobile wireless device comprises presenting, via a display of the primary mobile wireless device, a success message and
  execution of the instructions further causes the primary wireless device to connect to the secondary mobile wireless device responsive to receipt of a user input acknowledging the success message.

4. The primary wireless device of claim 1, wherein the primary mobile wireless device sends the message to initiate provisioning of the eSIM via a wireless personal area network (WPAN) connection when the primary mobile wireless device and the secondary mobile wireless device are within a pre-determined proximity distance of each other.

5. The primary wireless device of claim 1, wherein the primary mobile wireless device sends the message to initiate provisioning of the eSIM via a wireless local area network (WLAN) connection when the primary mobile wireless device and the secondary mobile wireless device i) are not within a pre-determined proximity distance of each other and ii) are connected to a common WLAN.

6. The primary wireless device of claim 1, wherein the primary mobile wireless device sends the message to initiate provisioning of the eSIM via a store-and-forward messaging server when the primary mobile wireless device and the secondary mobile wireless device i) are not within a pre-determined proximity distance of each other and ii) are not connected to a common WLAN.

7. The primary wireless device of claim 1, wherein the primary mobile wireless device provides an indication via a display of the primary mobile wireless device when pausing the cellular wireless service subscription.

8. The primary wireless device of claim 1, wherein execution of the instructions further causes the primary wireless device to, responsive to receipt, from the push notification server, of the notification message, where the notification message indicates the one or more of the identity check or the credit check completed successfully, present, via a display of the primary mobile wireless device, an indication of ongoing eSIM installation.

9. The primary wireless device of claim 1, wherein the primary mobile wireless device and the secondary mobile wireless device:
   share a common cloud-based service account;
   have distinct, linked user accounts; or
   share a common cellular wireless service subscription account of the MNO.

10. The primary wireless device of claim 1, wherein the primary mobile wireless device and the secondary mobile wireless device each have distinct cellular wireless service subscription accounts with the MNO or with different MNOs.

11. The primary wireless device of claim 1, wherein the requirements for the identity check include a photograph of a user of the primary mobile wireless device.

12. The primary wireless device of claim 1, wherein the requirements for the identity check include:
   a photograph of a user of the secondary mobile wireless device;
   a photograph of a national identity card; or
   a biometric input.

13. The primary wireless device of claim 12, wherein the biometric input includes a facial recognition capture.

14. An apparatus configurable for operation in a primary mobile wireless device, the apparatus comprising one or more processors communicatively coupled to a memory storing instructions that, when executed by the one or more processors, cause the primary mobile wireless device to perform actions including:
   providing, to a mobile network operator (MNO) web-sheet server, subscription information for a secondary mobile wireless device;
   receiving, from the MNO web-sheet server, an indication that the one or more of an identity check or a credit check requires additional time to complete;
   pausing cellular wireless service subscription for the secondary mobile wireless device;
   responsive to receipt, from a push notification server, of a notification message indicating the one or more of the identity check or the credit check completed successfully, resuming cellular wireless service subscription for the secondary mobile wireless device by at least:
      obtaining, from an MNO entitlement server, status information for an electronic subscriber identity module (eSIM) for the secondary mobile wireless device; and
      sending, to the secondary mobile wireless device, a message to initiate provisioning of the eSIM from an MNO provisioning server.

15. The apparatus of claim 14, wherein the subscription information for the secondary mobile wireless device comprises requirements for one or more of the identity check or the credit check.

16. The apparatus of claim 14, wherein execution of the instructions further causes the primary wireless device to, responsive to receipt, from the secondary mobile wireless device, of an indication of successful eSIM installation, updating a user interface of the primary mobile wireless device to indicate access to cellular wireless service of the MNO using the eSIM is available to the secondary mobile wireless device.

17. The apparatus of claim 14, wherein the requirements for the identity check include a photograph of a user of the primary mobile wireless device.

18. The apparatus of claim 14, wherein the requirements for the identity check include:
   a photograph of a user of the secondary mobile wireless device;
   a photograph of a national identity card; or
   a biometric input.

19. The apparatus of claim 18, wherein the biometric input includes a facial recognition capture.

20. A method for delayed cellular wireless service electronic subscriber identity module (eSIM) subscription for a secondary mobile wireless device, the method comprising:
   by a primary mobile wireless device:
      providing, to a mobile network operator (MNO) web-sheet server, subscription information for the secondary mobile wireless device;
      receiving, from the MNO web-sheet server, an indication that an identity check requires additional time to complete;
      pausing cellular wireless service subscription for the secondary mobile wireless device; and
      responsive to receipt, from a push notification server, of a notification message indicating the identity check completed successfully, resuming cellular wireless service subscription for the secondary mobile wireless device by at least:
         obtaining, from an MNO entitlement server, status information for an eSIM for the secondary mobile wireless device; and
         sending, to the secondary mobile wireless device, a message to initiate provisioning of the eSIM from an MNO provisioning server.

\* \* \* \* \*